United States Patent
Janarthanam et al.

(10) Patent No.: US 11,858,550 B2
(45) Date of Patent: Jan. 2, 2024

(54) ELECTRIFIED VEHICLE MODULE BRACE ASSEMBLY AND SUPPORTING METHOD

(71) Applicant: Ford Global Technologies, LLC, Dearborn, MI (US)

(72) Inventors: Suriyaprakash Ayyangar Janarthanam, Canton, MI (US); Do Young Chung, Windsor (CA); Robert Bartz, Detroit, MI (US); Jason C. Marcath, Dearborn, MI (US); Chelliah Madasamy, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 413 days.

(21) Appl. No.: 17/027,444

(22) Filed: Sep. 21, 2020

(65) Prior Publication Data

US 2022/0089222 A1    Mar. 24, 2022

(51) Int. Cl.
| | |
|---|---|
| *B62D 21/03* | (2006.01) |
| *B60L 53/22* | (2019.01) |
| *B60K 6/26* | (2007.10) |
| *B62D 21/15* | (2006.01) |
| *B60K 1/00* | (2006.01) |
| *B60K 6/40* | (2007.10) |
| *B62D 21/09* | (2006.01) |
| *B62D 21/11* | (2006.01) |
| *B60K 6/445* | (2007.10) |

(52) U.S. Cl.
CPC ............. *B62D 21/03* (2013.01); *B60K 6/26* (2013.01); *B60L 53/22* (2019.02); *B62D 21/15* (2013.01); *B60K 1/00* (2013.01); *B60K 6/40* (2013.01); *B60K 6/445* (2013.01); *B60L 2210/10* (2013.01); *B62D 21/09* (2013.01); *B62D 21/11* (2013.01); *B62D 21/155* (2013.01); *Y02T 10/70* (2013.01); *Y02T 10/7072* (2013.01); *Y02T 90/14* (2013.01)

(58) Field of Classification Search
CPC ...... B62D 21/03; B62D 21/15; B62D 21/155; B62D 21/11; B62D 21/09; B60K 6/26; B60K 6/40; B60K 6/445; B60K 1/00; B60L 53/22; B60L 2210/10; Y02T 10/70; Y02T 10/7072; Y02T 90/14
USPC ....................................................... 296/204
See application file for complete search history.

(56) References Cited

U.S. PATENT DOCUMENTS

| | | | |
|---|---|---|---|
| 7,886,861 B2 * | 2/2011 | Nozaki | B60K 1/00 280/783 |
| 8,336,657 B2 | 12/2012 | Dobbins et al. | |
| 8,534,748 B1 | 9/2013 | Aghssa et al. | |
| 8,708,401 B2 | 4/2014 | Lee et al. | |
| 10,559,795 B1 | 2/2020 | Madasamy et al. | |
| 11,292,523 B2 * | 4/2022 | Shah | B62D 21/152 |

(Continued)

FOREIGN PATENT DOCUMENTS

CN    203438965    2/2014

*Primary Examiner* — Amy R Weisberg
*Assistant Examiner* — Dana D Ivey
(74) *Attorney, Agent, or Firm* — David B. Kelley; Carlson, Gaskey & Olds, P.C.

(57) ABSTRACT

An electrified vehicle assembly according to an exemplary aspect of the present disclosure includes, among other things, a brace assembly that extends from a passenger side frame rail of a vehicle to a driver side frame rail of the vehicle, and at least one electrified vehicle powertrain module supported by the brace assembly.

17 Claims, 4 Drawing Sheets

(56) References Cited

U.S. PATENT DOCUMENTS

2019/0126989 A1* 5/2019 Okura ................... B62D 25/08
2019/0359068 A1   11/2019 Marukawa et al.
2020/0376946 A1* 12/2020 Kuwahara .............. B62D 21/11

* cited by examiner

ELECTRIFIED VEHICLE MODULE BRACE ASSEMBLY AND SUPPORTING METHOD

TECHNICAL FIELD

This disclosure relates generally to supporting components of an electrified vehicle powertrain.

BACKGROUND

Electrified vehicles differ from conventional motor vehicles because electrified vehicles are selectively driven using one or more electric machines powered by a traction battery pack. The electric machines can drive the electrified vehicles instead of, or in addition to, an internal combustion engine. A traction battery pack of an electrified vehicle can include a plurality of battery cell assemblies arranged in one or more battery arrays with an enclosure.

SUMMARY

An electrified vehicle assembly according to an exemplary aspect of the present disclosure includes, among other things, a brace assembly that extends from a passenger side frame rail of a vehicle to a driver side frame rail of the vehicle, and at least one electrified vehicle powertrain module supported by the brace assembly.

In another example of the foregoing assembly, the brace assembly includes a cross-brace, a driver side bridging bracket, and a passenger side bridging bracket.

In another example of any of the foregoing assemblies, the driver side bridging bracket and a driver side of the cross-brace are configured to sandwich a portion of the driver side frame rail. The passenger side bridging bracket and a passenger side of the cross-brace are configured to sandwich a portion of the passenger side frame rail.

In another example of any of the foregoing assemblies, the driver side bridging bracket is secured directly to the cross-brace and an upper side of the driver side frame rail, and the passenger side bridging bracket is secured directly to the cross-brace and an upper side of the passenger side frame rail.

Another example of any of the foregoing assemblies includes at least one driver side foot of the cross-brace that is secured directly to a lower side of the driver side frame rail, and at least one passenger side foot of the cross-member that is secured directly to a lower side of the passenger side frame rail.

In another example of any of the foregoing assemblies, the driver side bridging bracket is secured directly to the cross-brace and an upper side of the driver side frame rail, and the passenger side bridging bracket is secured directly to the cross-brace and an upper side of the passenger side frame rail.

In another example of any of the foregoing assemblies, the driver side bridging bracket is mechanically fastened to the upper side of the driver side frame rail.

In another example of any of the foregoing assemblies, the at least one driver side foot and the at least one passenger side foot each include a frangible feature configured to yield in response to a load.

In another example of any of the foregoing assemblies, the frangible feature is provided by an aperture.

In another example of any of the foregoing assemblies, the aperture is a blind aperture.

In another example of any of the foregoing assemblies, the at least one driver side foot includes a front driver side foot and a rear driver side foot. The at least one passenger side foot includes a front passenger side foot and a rear passenger side foot.

Another example of any of the foregoing assemblies includes an electric machine that is disposed below the cross-brace and is supported by the brace assembly.

In another example of any of the foregoing assemblies, the brace assembly and the at least one electrified vehicle powertrain module are disposed within a front trunk of the vehicle.

In another example of any of the foregoing assemblies, the at least one electrified vehicle powertrain module is a high-voltage module.

In another example of any of the foregoing assemblies, the at least one electrified vehicle powertrain module further includes a DC/DC converter, an onboard generator, and an onboard charger all supported by the brace assembly at a position atop a cross-brace of the brace assembly.

An electrified vehicle module supporting method includes, among other things, securing a brace assembly directly to both a passenger side frame rail and a driver side frame rail, and supporting at least one high-voltage module on the brace assembly.

In another example of the foregoing method, the high voltage module is an inverter system controller.

In another example of any of the foregoing methods, the brace assembly includes a frangible feature that is configured to fracture in response to a load.

Another example of any of the foregoing methods includes machining the at least one frangible feature into the brace assembly.

Another example of any of the foregoing methods includes securing an electric machine to an underside of the cross-brace.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a brace assembly utilized to support high voltage modules of an electrified vehicle powertrain. Exemplary high voltage modules supported by the brace can include an onboard charger, an onboard generator, a converter, an inverter system controller, or some combination of these. The brace is configured to yield in response to a load to provide a desired kinematic response.

Figure 1:
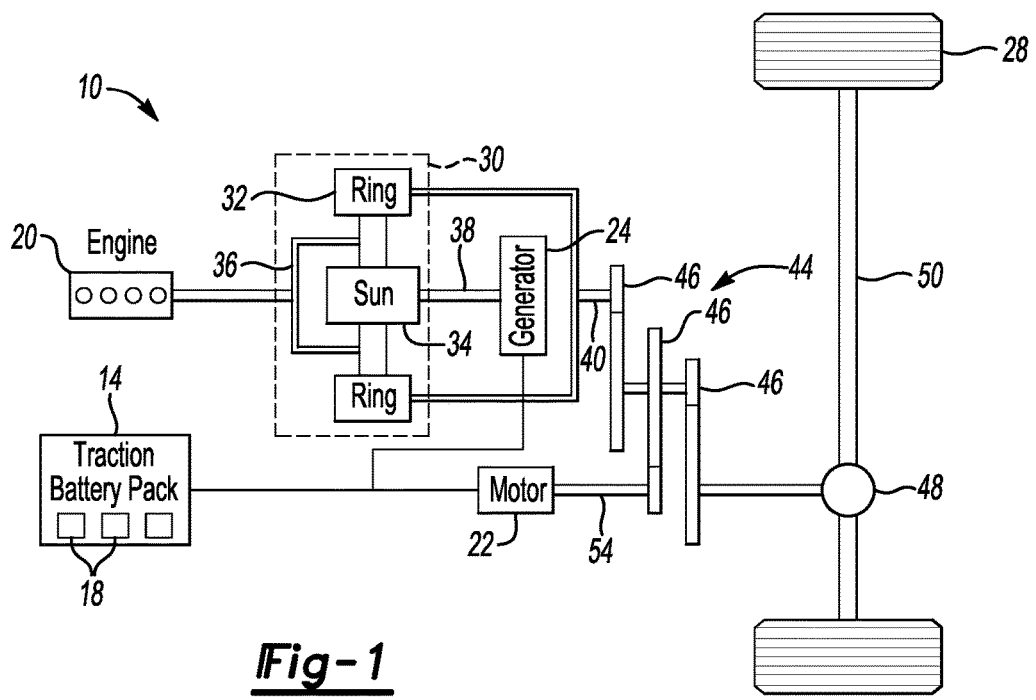
FIG. 1 schematically illustrates a powertrain of an exemplary electrified vehicle.

Referring to FIG. 1, a powertrain 10 of a plug-in hybrid electric vehicle (PHEV) includes a traction battery pack 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

Although depicted as a PHEV, it should be understood that the concepts described herein are not limited to PHEVs and could extend to traction battery packs in any other type of electrified vehicle, including, but not limited to, other hybrid electric vehicles (HEVs), battery electric vehicles (BEVs), fuel cell vehicles, etc.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the traction battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the traction battery pack 14.

Figure 2:
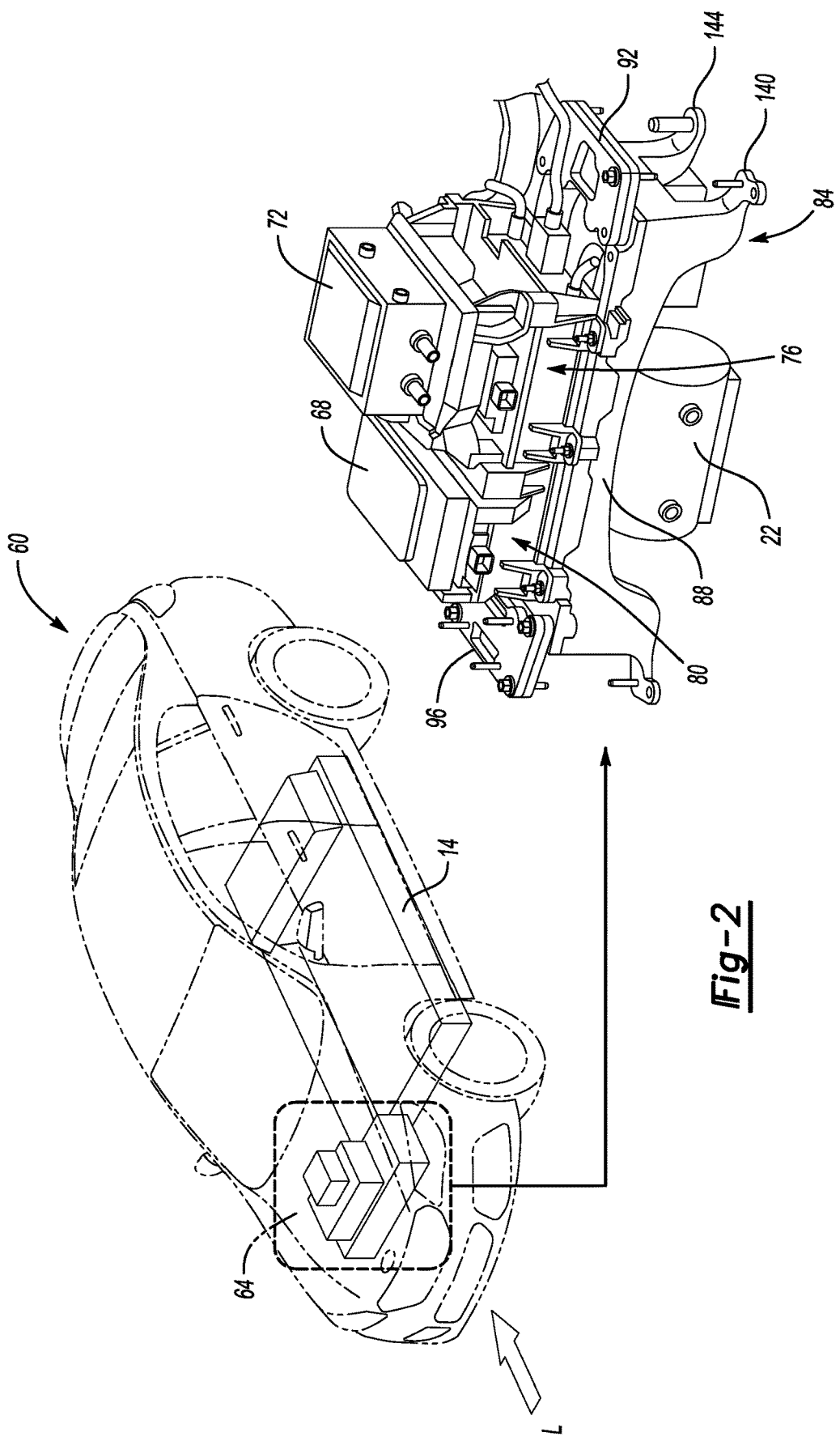
FIG. 2 illustrates an electrified vehicle incorporating the powertrain of FIG. 1 and a close up of selected portions of the powertrain of FIG. 1.

With reference to FIG. 2, a vehicle 60 includes the powertrain 10. In the exemplary vehicle 60, the traction battery pack 14 is positioned adjacent an underbody of the vehicle 60. High voltage modules of the powertrain 10 are positioned in a front compartment or frunk area of the vehicle 60 beneath a hood 64. In this example, the high voltage modules include a DC/DC converter 68, an inverter system controller 72, an onboard generator 76, and an onboard charger 80. In the exemplary embodiment, the high voltage modules are supported by a brace assembly 84. For purposes of this disclosure, high voltage is voltage greater than or equal to 60 volts. High voltage modules are modules configured to accommodate voltage greater than or equal to 60 volts.

Figure 3:
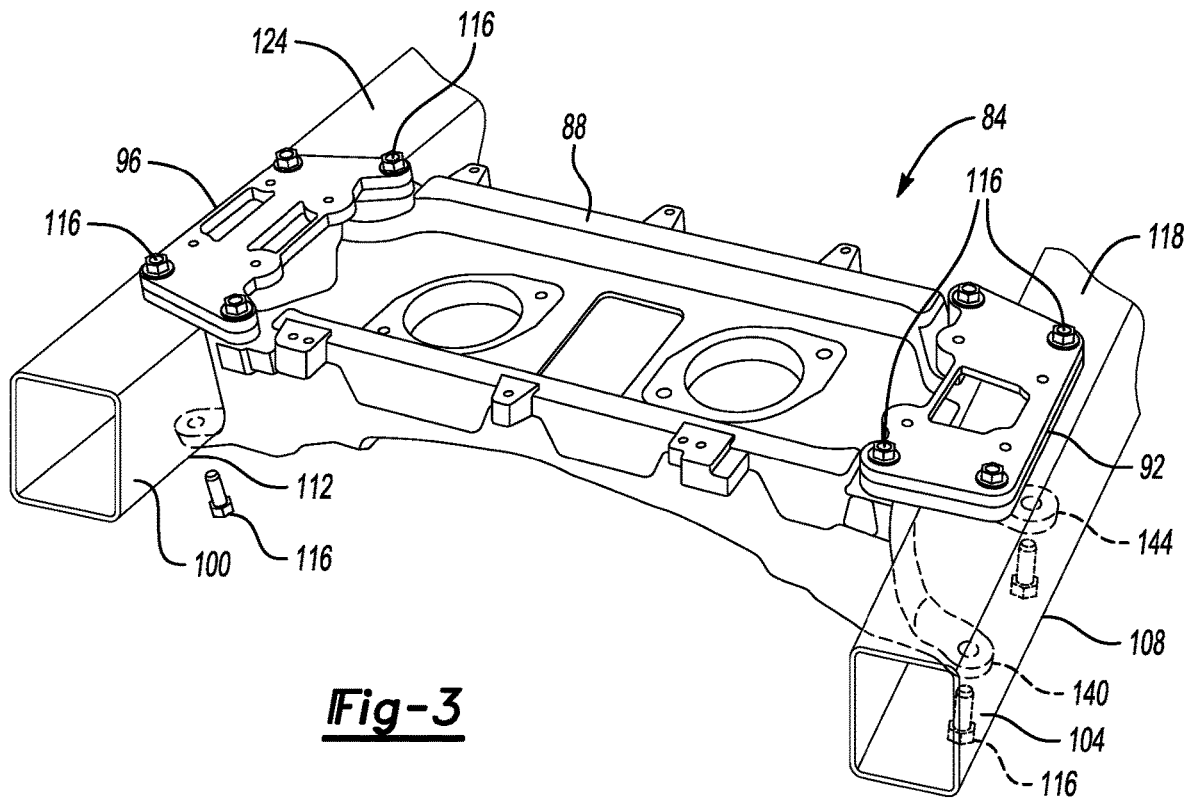
FIG. 3 illustrates a perspective view of a brace assembly secured to frame rails of the vehicles of FIG. 2.
Figure 4:
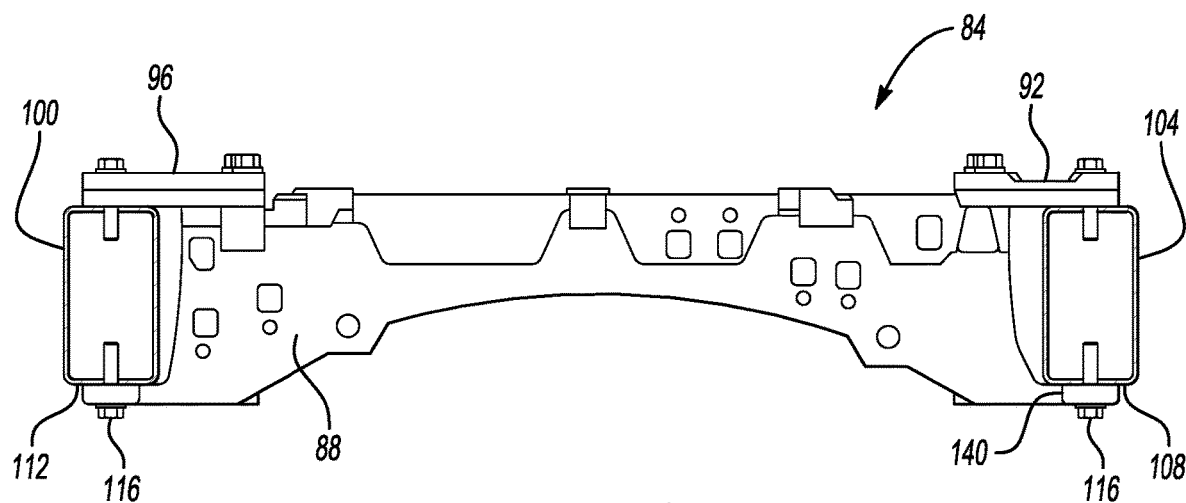
FIG. 4 illustrates a front view of the brace assembly and frame rails of FIG. 2.

With reference now to FIGS. 3 and 4 and continued reference to FIG. 2, the brace assembly 84, in the exemplary embodiment, includes a cross-brace 88, a driver side bridging bracket 92, and a passenger side bridging bracket 96. The brace assembly 84 extends in a cross-vehicle direction from a passenger side frame rail 100 to a driver side frame rail 104 of the vehicle 60. The frame rails 100, 104 extend longitudinally along a length of the vehicle 60. In the exemplary embodiment, the cross-brace 88, driver side bridging bracket 92, and passenger side bridging bracket 96 are separate and distinct components that are pressure die cast separately from each other.

When installed, the driver side bridging bracket 92 and a driver side of the cross-brace 88 sandwich a portion of the driver side frame rail 104. Similarly, the passenger side bridging bracket 96 and a passenger side of the cross-brace 88 sandwich a portion of the passenger side frame rail 100.

During assembly, the cross-brace 88 can be moved vertically upward from beneath the frame rails 100, 104. The cross-brace 88 can then be secured to a lower surface 108 of the frame rail 100 and a lower surface 112 of the frame rail 104 utilizing, for example, mechanical fasteners 116.

The driver side bridging bracket 92 can then be secured to an upper surface 118 of the driver side frame rail 104 and a driver side of the cross-brace 88 to sandwich the driver side frame rail 104. Also, the passenger side bridging bracket 96 can be secured to an upper surface 124 of the passenger side frame rail 100 and to a passenger side of the cross-brace 88. The mechanical fasteners 116 can be used to secure the driver side bridging bracket 92 and the passenger side bridging bracket 96.

The multi-piece design of the exemplary brace assembly 84 thus facilitates assembly and decking of the brace assembly 84 to the frame rails 100, 104 during vehicle assembly. With the frame rails 100, 104 in an installed position, the cross-brace 88 can moved vertically upward from beneath the frame rails 100, 104 to an installed position. The driver side bridging bracket 92 and passenger side bridging bracket 96 can then be moved to an installed position from vertically above the frame rails 100, 104.

A forward driver side foot 140 and a rear driver side foot 144 extend laterally outward on the driver side of the cross-brace 88. The feet 140, 144 each include an aperture that receives one of the mechanical fasteners 116 when secured directly to the lower surface 108. The feet 140, 144 can directly contact the lower surface 108 of the frame rail 104 when secured to the frame rail 104.

The passenger side of the cross-brace 88 includes a forward foot and a rearward foot that extend laterally outward beneath the frame rail 100 and directly contact the lower surface 112 when secured directly to the frame rail 100.

The various high voltage modules, here, the converter 68, the converter system controller 72, generator 76, and charger 80 are disposed directly atop the cross-brace 88 when secured to the brace assembly 84. The brace assembly 84 can further be used to support an electric machine, here the motor 22, which can be located directly vertically beneath the cross-brace 88 of the brace assembly 84.

Figure 5:
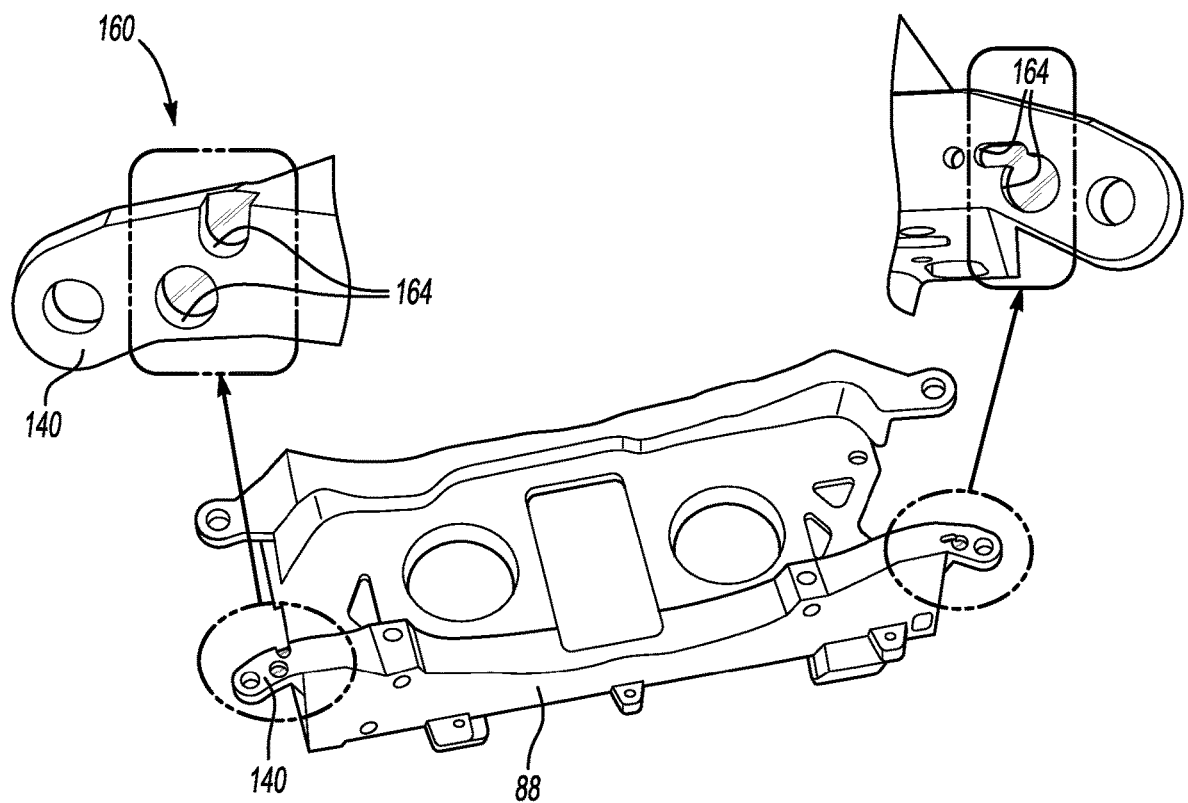
FIG. 5 illustrates a close up view of a front driver side foot of a cross-brace of the brace assembly of FIGS. 3 and 4.

With reference now to FIG. 5 and continued reference to FIGS. 2-4, the front driver side foot 140, in the exemplary embodiment, includes a frangible feature 160. In the exemplary embodiment, the frangible feature 160 is provided by apertures 164, which can be holes, slots, or cavities.

In the exemplary embodiment, the apertures 164 are blind apertures. For purposes of this disclosure, blind apertures refers to apertures that do not extend entirely through the front driver side foot 140. That is, blind apertures open to either the first side or an opposite, second side of the foot, but not to both the first side and the second side.

When a load L (FIG. 2) is directed to the vehicle 60, the resulting load path can extend through the brace assembly 84. Due to the frangible feature 160, the cross-brace 88 tends to fracture in the area of the frangible feature 160. This is due to, among other things, a reduced thickness of the front driver side foot 140 in this area. Due to the frangible feature 160, the front driver side foot 140 is configured to breakaway in response to the load L. The load L necessary to fracture the frangible feature 160 can be a relatively large load such as a load resulting from an impact event.

A front passenger side foot of the cross-brace 88 can be similarly configured to include blind apertures that can encourage a fracture in a desired area of the brace assembly 84 when load is applied. Since the frangible feature fractures in response to the load L, the load L does not drive the cross-brace 88 and the various modules held by the brace assembly 84 rearward toward a passenger compartment of the vehicle 60. Avoiding such movement can be desirable in some situations.

The size and placement of the apertures 164 of the frangible feature 160 can be designed in such a way to yield during the impact event while the remaining portions of the brace assembly 84 and modules continue to absorb load.

In this example, the apertures 164, which again are blind apertures, open to a vertically downward surface of the front driver side foot 140. In another example, the apertures 164 could instead extend entirely through the front driver side foot 140 could open to a top side of the driver side foot 140.

Figure 6:
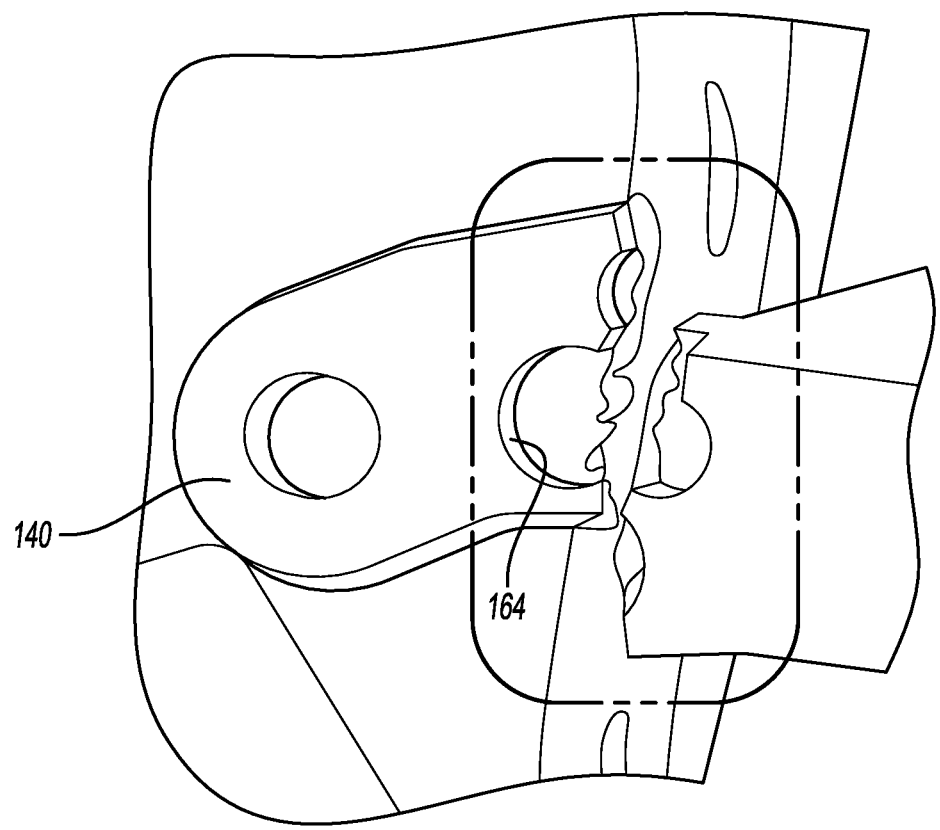
FIG. 6 illustrates a perspective view of the front driver side foot of FIG. 5 after yielding in response to a load.

FIG. 6 shows the front driver side foot 140 after yielding and fracturing in response to the load L. Notably, the load L has fractured the front driver side foot 140 in the area of the apertures 164. The frangible feature 160 can help to absorb energy while permitting movement of the cross-brace 88 relative to the driver side frame rail 104.

The apertures 164 of the exemplary embodiment can be machined into the foot 140 of the cross-brace 88. In another example, the apertures 164 is cast to include the aperture. Casting the apertures 164 can eliminate extra machine operations, time, and reduce costs.

Features of the disclosed example include an efficient design solution that can facilitate a desired response to an applied load. The cross-brace can provide the support necessary for various modules while yielding in response to a load to inhibit relative movement of the modules and cross-brace toward a passenger compartment of the vehicle.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An electrified vehicle assembly, comprising:
a brace assembly that extends from a passenger side frame rail of a vehicle to a driver side frame rail of the vehicle; and
at least one electrified vehicle powertrain module supported by the brace assembly,
wherein the brace assembly includes a cross-brace, a driver side bridging bracket, and a passenger side bridging bracket,
wherein the cross-brace is secured directly to both the driver side bridging bracket and the passenger side bridging bracket,
wherein the cross-brace, the driver side bridging bracket, and the passenger side bridging bracket are separate and distinct from each other,
wherein at least one driver side foot of the cross-brace is secured directly to a lower side of the driver side frame rail, and at least one passenger side foot of the cross-brace is secured directly to a lower side of the passenger side frame rail.

2. The electrified vehicle assembly of claim 1, wherein the driver side bridging bracket and a driver side of the cross-brace are configured to sandwich a portion of the driver side frame rail vertically between the driver side bridging bracket and the driver side of the cross-brace, wherein the passenger side bridging bracket and a passenger side of the cross-brace are configured to sandwich a portion of the passenger side frame rail vertically between the passenger side bridging bracket and the passenger side of the cross-brace.

3. The electrified vehicle assembly of claim 1, wherein the driver side bridging bracket is secured directly to the cross-brace and an upper side of the driver side frame rail, and the passenger side bridging bracket is secured directly to the cross-brace and an upper side of the passenger side frame rail.

4. The electrified vehicle assembly of claim 1, wherein the driver side bridging bracket is a singular bracket that is secured directly to the cross-brace and secured directly to an upper side of the driver side frame rail, and the passenger side bridging bracket is a singular bracket that is secured directly to the cross-brace and secured directly an upper side of the passenger side frame rail.

5. The electrified vehicle assembly of claim 4, wherein the driver side bridging bracket is mechanically fastened to the upper side of the driver side frame rail with at least one threaded fastener.

6. The electrified vehicle assembly of claim 1, wherein the at least one driver side foot and the at least one passenger side foot each include a frangible feature configured to yield in response to a load.

7. The electrified vehicle assembly of claim 6, wherein the frangible feature is provided by an aperture.

8. The electrified vehicle assembly of claim 7, wherein the aperture is a blind aperture.

9. The electrified vehicle assembly of claim 1, further comprising an electric machine that is disposed below the cross-brace and is supported by the brace assembly.

10. The electrified vehicle assembly of claim 1, wherein the brace assembly and the at least one electrified vehicle powertrain module are disposed within a front trunk of the vehicle.

11. The electrified vehicle assembly of claim 1, wherein the at least one electrified vehicle powertrain module is a high voltage module.

12. The electrified vehicle assembly of claim 11, wherein the at least one electrified vehicle powertrain module further includes a DC/DC converter, an onboard generator, and an onboard charger all supported by the brace assembly at a position atop a cross-brace of the brace assembly.

13. An electrified vehicle assembly, comprising:
a brace assembly that extends from a passenger side frame rail of a vehicle to a driver side frame rail of the vehicle, the brace assembly including a cross-brace, a driver side bridging bracket, and a passenger side bridging bracket;
at least one electrified vehicle powertrain module supported by the brace assembly; and
at least one driver side foot of the cross-brace that is secured directly to a lower side of the driver side frame rail, and at least one passenger side foot of the cross-brace that is secured directly to a lower side of the passenger side frame rail,
wherein the at least one driver side foot and the at least one passenger side foot each include a frangible feature configured to yield in response to a load,
wherein the at least one driver side foot includes a front driver side foot and a rear driver side foot, wherein the at least one passenger side foot includes a front passenger side foot and a rear passenger side foot.

14. An electrified vehicle module supporting method, comprising:
securing a brace assembly directly to both a passenger side frame rail and a driver side frame rail; and
supporting at least one high voltage module on the brace assembly, wherein the brace assembly includes at least one frangible feature that is configured to fracture in response to a load,
wherein the brace assembly includes a cross-brace having at least one passenger side foot that is secured directly to a lowermost side of the passenger side frame rail, and at least one driver side foot that is secured directly to a lowermost side of the driver side frame rail.

15. The electrified vehicle module supporting method of claim 14, further comprising machining the at least one frangible feature into the brace assembly.

16. The electrified vehicle module supporting method of claim 14, further comprising securing an electric machine to the brace assembly.

17. The electrified vehicle module supporting method of claim 14, wherein the brace assembly includes a cross-brace, a driver side bridging bracket, and a passenger side bridging bracket, wherein the cross-brace is secured directly to both the driver side bridging bracket and the passenger side bridging bracket, wherein the cross-brace, the driver side bridging bracket, and the passenger side bridging bracket are separate and distinct from each other, wherein the driver side bridging bracket is a singular bracket that is secured directly to the cross-brace and secured directly to an upper side of the driver side frame rail, and the passenger side bridging bracket is a singular bracket that is secured directly to the cross-brace and secured directly an upper side of the passenger side frame rail.

* * * * *